United States Patent
Williams

(10) Patent No.: US 10,776,263 B2
(45) Date of Patent: Sep. 15, 2020

(54) NON-DETERMINISTIC WINDOW SCHEDULING FOR DATA STORAGE SYSTEMS

(71) Applicant: Seagate Technology LLC, Cupertino, CA (US)

(72) Inventor: Steven S. Williams, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/216,415

(22) Filed: Dec. 11, 2018

(65) Prior Publication Data
US 2020/0004674 A1   Jan. 2, 2020

Related U.S. Application Data

(60) Provisional application No. 62/690,684, filed on Jun. 27, 2018.

(51) Int. Cl.
*G06F 13/00* (2006.01)
*G06F 12/02* (2006.01)
(Continued)

(52) U.S. Cl.
CPC ........ *G06F 12/0246* (2013.01); *G06F 9/4887* (2013.01); *G06N 20/00* (2019.01);
(Continued)

(58) Field of Classification Search
CPC ............... G06F 12/0246; G06F 9/4887; G06F 2212/2022; G06F 2212/7205; G06N 20/00
See application file for complete search history.

(56) References Cited

U.S. PATENT DOCUMENTS 5,887,191 A * 3/1999 Adiga .................. G06F 13/126
 709/206
5,946,466 A * 8/1999 Adiga ................... H04N 21/21
 709/231
(Continued)

OTHER PUBLICATIONS

"Achieving Predictable Latency for Solid State Drives" by Mrrk Carlson, Toshiba, SSD-SNIA-SDC-EMEA-2018 (Year: 2018).*
(Continued)

*Primary Examiner* — Jing-Yih Shyu
(74) *Attorney, Agent, or Firm* — Hall Estill Attorneys at Law; Tyler J. Mantooth

(57) ABSTRACT

A semiconductor data storage memory can be arranged with an accumulated list in a memory of background operations to be carried out upon a semiconductor memory formed of one or more non-volatile memory dies. When a deterministic window interval is entered responsive to a request from a host during which data transfers between the host and the semiconductor memory meet a minimum predetermined data transfer rate, the accumulated list is sorted into a first set of the background operations that can be performed during the deterministic window interval while maintaining the minimum predetermined data transfer rate and a remaining second set of the background operations. The first set of the background operations is performed during the deterministic window interval prior to the second set of background operations being performed after a conclusion of the deterministic window interval.

20 Claims, 8 Drawing Sheets

(51) Int. Cl.
*G06F 9/48* (2006.01)
*G06N 20/00* (2019.01)
(52) U.S. Cl.
CPC ............... *G06F 2212/2022* (2013.01); *G06F 2212/7205* (2013.01)

(56) References Cited

U.S. PATENT DOCUMENTS

| | | | |
|---|---|---|---|
| 8,321,627 B1* | 11/2012 | Norrie | G06F 13/161 365/185.33 |
| 9,711,232 B2* | 7/2017 | Choi | G11C 16/30 |
| 2014/0310494 A1* | 10/2014 | Higgins | G06F 12/0246 711/167 |
| 2018/0095915 A1 | 4/2018 | Prabhakar et al. | |
| 2019/0042150 A1* | 2/2019 | Wells | G06F 3/0644 |
| 2019/0042413 A1* | 2/2019 | Wysocki | G06F 12/0804 |
| 2019/0050161 A1* | 2/2019 | Wysocki | G06F 13/1673 |
| 2019/0278515 A1* | 9/2019 | Wells | G06F 3/064 |
| 2019/0377674 A1* | 12/2019 | Perlmutter | G06F 12/0246 |

OTHER PUBLICATIONS

"Solving Latency Challenges with NVM Exprees SSDs at Scale", by Chrid Paterson & Amber Huffman, Aug. 9, 2017 (Year: 2017).*
"Why Deterministic Storage Performance is Important" by Chris Evans, Jul. 2018, Retrieved from https://blog.architecting.it/deterministic-storage-performance/ (Year: 2018).*

\* cited by examiner

NON-DETERMINISTIC WINDOW SCHEDULING FOR DATA STORAGE SYSTEMS

RELATED APPLICATION

The present application makes a claim of domestic priority to U.S. Provisional Patent Application No. 62/690,684 filed Jun. 27, 2018, the contents of which are hereby incorporated by reference.

SUMMARY

Various embodiments of the present disclosure are generally directed to the management of operations in a memory, such as, but not limited to, a flash memory in a solid state drive (SSD).

A data storage semiconductor memory, in some embodiments, has an accumulated list in a memory of background operations to be carried out upon a semiconductor memory formed of one or more non-volatile memory dies. When a deterministic window interval is entered responsive to a request from a host during which data transfers between the host and the semiconductor memory meet a minimum predetermined data transfer rate, the accumulated list is sorted into a first set of the background operations that can be performed during the deterministic window interval while maintaining the minimum predetermined data transfer rate and a remaining second set of the background operations. The first set of the background operations is performed during the deterministic window interval prior to the second set of background operations being performed after a conclusion of the deterministic window interval.

These and other features which may characterize various embodiments can be understood in view of the following detailed discussion and the accompanying drawings.

DETAILED DESCRIPTION

Figure 1:
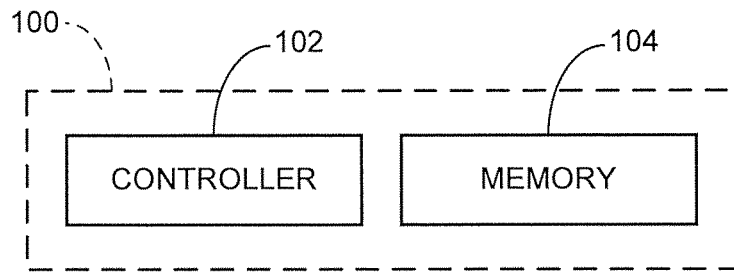
FIG. 1 provides a functional block representation of a data storage device in accordance with various embodiments.

Without limitation, the various embodiments disclosed herein are generally directed to managing data access and data maintenance operations in one or more data storage devices of a data storage system to provide consistent data read latency in a deterministic window.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into NVMe sets in accordance with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a forward map and a reverse directory, although other forms can be used.

The forward map provides an overall map structure that can be accessed by a controller to service a received host access command (e.g., a write command, a read command, etc.). The forward map may take the form of a two-level map, where a first level of the map maintains the locations of map pages and a second level of the map provides a flash transition layer (FTL) to provide association of logical addresses of the data blocks to physical addresses at which the blocks are stored. Other forms of maps can be used including single level maps and three-or-more level maps, but each generally provides a forward map structure in which pointers may be used to point to each successive block until the most current version is located.

The reverse directory can be written to the various GCUs and provides local data identifying, by logical address, which data blocks are stored in the associated GCU. The reverse directory, also sometimes referred to as a footer, thus provides a physical to logical association for the locally stored blocks. As with the forward map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a flash (or other semiconductor) memory module. A number of channels, or lanes, are provided to enable communications between the controller and dies within the flash memory. One example is an 8 lane/128 die configuration, with each lane connected to 16 dies. The dies are further subdivided into planes, GCUs, erasure blocks, pages, etc. Groups of dies may be arranged into separate die sets, or namespaces. This allows the various die sets to be concurrently serviced for different owners (users). A data storage device generally carries out three (3) main operations: (1) hot data transfers during which user data sets are written to or read from the flash memory; (2) cold data transfers during which the device carries out garbage collection and other operations to free up memory for the storage of new data; and (3) map updates in which snapshots and journals are accumulated and written to maintain an up-to-date system map of the memory locations in which data sets are stored.

The NVMe Specification allows a data storage device to periodically enter a deterministic window (DW) during which certain operational performance is guaranteed, such as guaranteed data delivery without retransmission. The specification is not clear on exactly how long the DW is required to last, or by what metrics the device can be measured. One example of a DW performance is that X number of reads can be carried out at a certain minimum data transfer rate; another is that so many blocks may be written to completion within a particular period of time. It is contemplated that a user can declare a DW at substantially any given time, and it is not usually known when a DW will be declared. There is a non-deterministic window (NDW) that will occur after each DW to allow the device to recover and carry out background operations, etc.

A problem arises with the scheduling of regularly occurring background operations, such as garbage collection, map updates, system calibrations, etc. that would normally fall during DW periods. These operations may or may not be able to be delayed during the DW period. Accordingly, reducing error rate and conducting data maintenance ("background") operations during non-deterministic window intervals can improve the quality of service during deterministic window intervals. By accelerating (pre-scheduling) calibration reads and writes or other calibration type mechanisms (like first reads in 3D NAND) ahead of a known scheduled time to coincide with NDWs, no scheduled background operations are conducted during DW periods, or at least to limit the background operations during DW periods, to maintain guaranteed performance levels to a host.

Various embodiments may involve an effort to monitor for DW events and affirmatively track performance during the windows, followed by the drive affirmatively ending the DW window once the criteria have been met. A list of NDW tasks may be generated and carried out during normal operations. Once a DW is declared, a manager circuit may review the list to prioritize the listed tasks to determine which can be delayed and which need to be carried out during the DW period, with operations scheduled to ensure compliance with the DW interval is maintained. Actual performance can be measured for better compliance during a subsequent DW, such as by evaluating available margin and adding additional tasks to the DW during the next occurrence.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices, such as other data storage devices, network server, network node, or remote controller.

Figure 2:
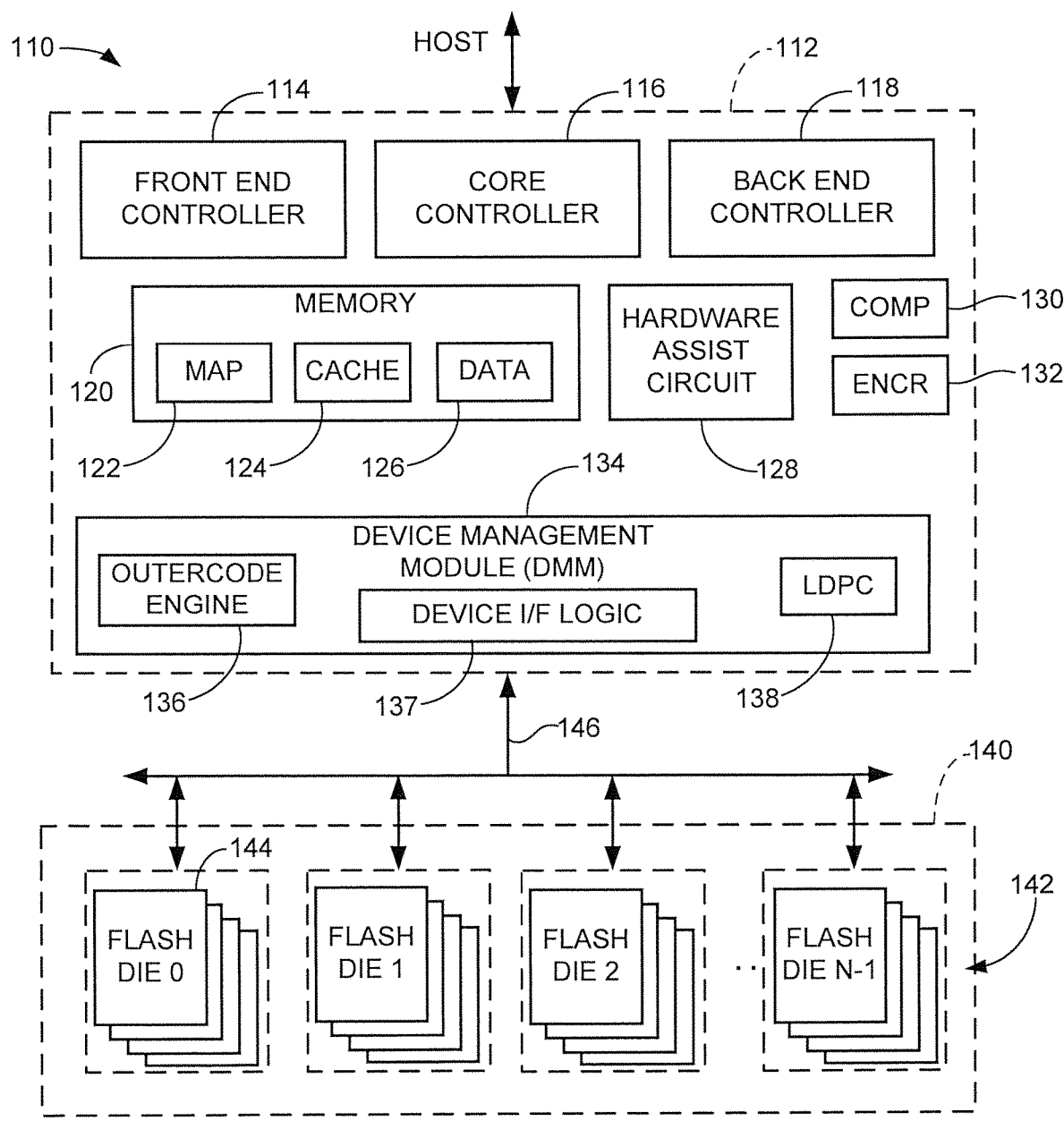
FIG. 2 shows aspects of the device of FIG. 1 characterized as a solid state drive (SSD) in accordance with some embodiments.

FIG. 2 displays an example data storage device 110 generally corresponding to the device 100 in FIG. 1. The device 110 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVMe sets (die sets) for use in the storage of data. Each NVMe set may form a portion of an NVMe Namespace that may span multiple SSDs or be contained within a single SSD.

The SSD 110 includes a controller circuit 112 with a front end controller 114, a core controller 116 and a back end controller 118. The front end controller 114 performs host I/F functions, the back end controller 118 directs data transfers with the memory module 140 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware assist circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via one or more channels (lanes) 146.

Figure 3:
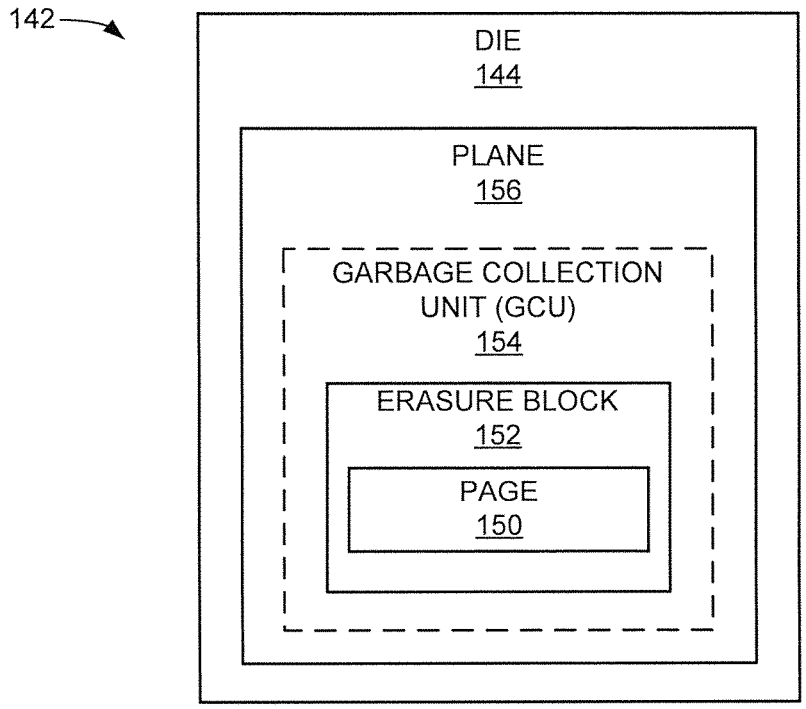
FIG. 3 shows an arrangement of the flash memory of FIG. 2 in some embodiments.

FIG. 3 shows an arrangement of the various flash memory dies 144 in the flash memory 142 of FIG. 2 in some embodiments. Other configurations can be used. The smallest unit of memory that can be accessed at a time is referred to as a page 150. A page may be formed using a number of flash memory cells that share a common word line. The storage size of a page can vary; current generation flash memory pages can store, in some cases, 16 KB (16,384 bytes) of user data.

The memory cells associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies.

Each die 144 may include a plurality of planes 156. Examples include two planes per die, four planes per die, etc. although other arrangements can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
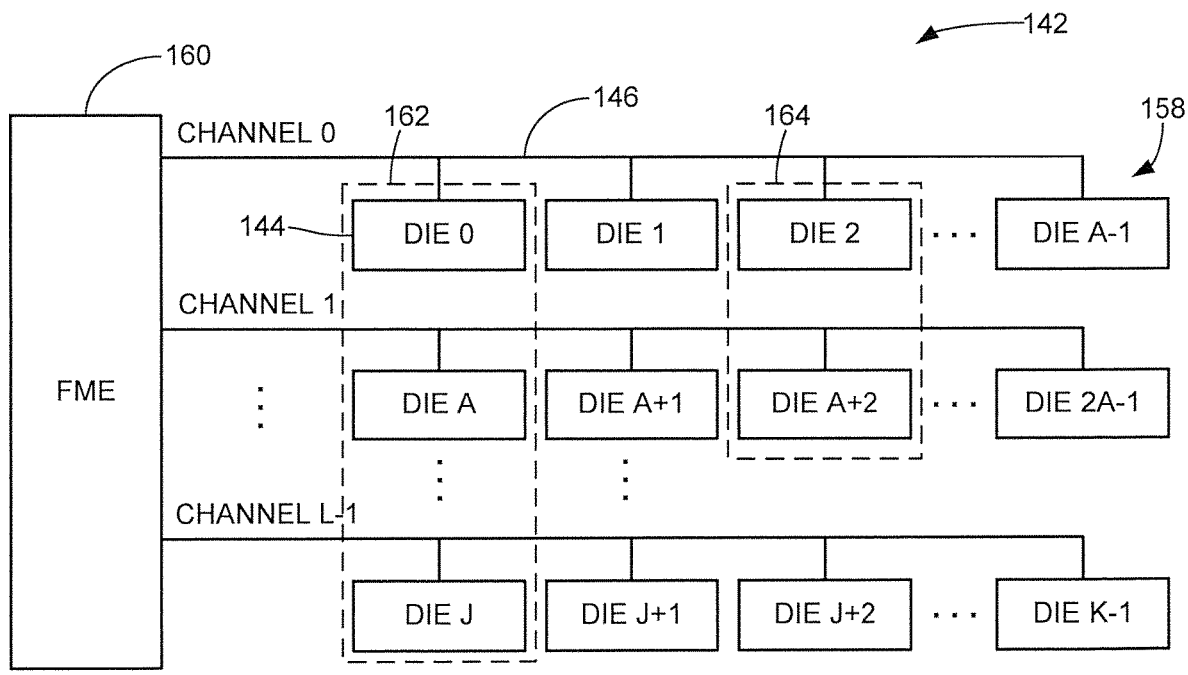
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 160 of the flash memory module 142 controls each of the channels 146 to transfer data to and from the dies 144.

In some embodiments, the various dies are arranged into one or more die sets. A die set represents a portion of the storage capacity of the SSD that is allocated for use by a particular host (user/owner). Die sets are usually established with a granularity at the die level, so that some percentage of the total available dies 144 will be allocated for incorporation into a given die set.

A first example die set is denoted at 162 in FIG. 4. This first set 162 uses a single die 144 from each of the different channels 146. This arrangement provides fast performance during the servicing of data transfer commands for the set since all eight channels 146 are used to transfer the associated data. A limitation with this approach is that if the set 162 is being serviced, no other die sets can be serviced during that time interval. While the set 162 only uses a single die from each channel, the set could also be configured to use multiple dies from each channel, such as 16 dies/channel, 32 dies/channel, etc.

A second example die set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple die sets at the same time, provided the sets do not share the same (e.g., an overlapping) channel 146.

Figure 5:
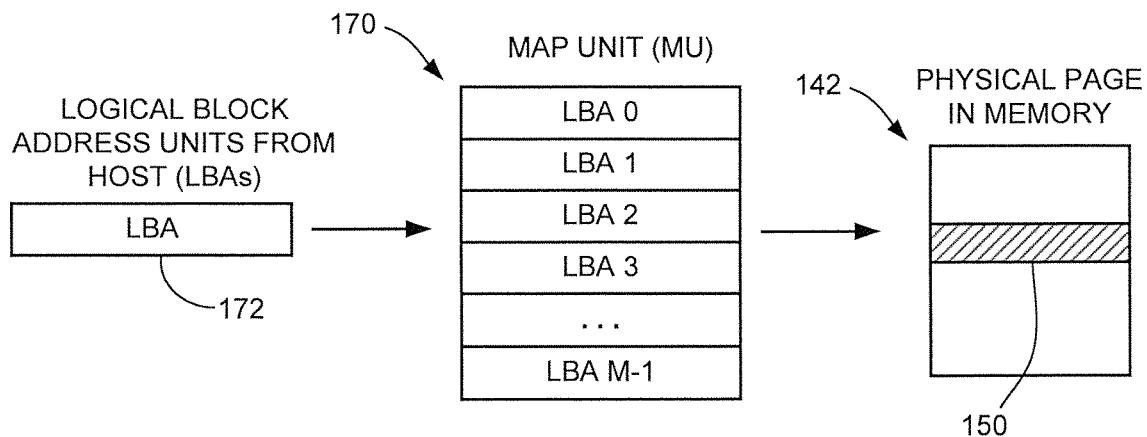
FIG. 5 illustrates a map unit (MU) as a data arrangement stored to the flash memory of FIG. 2.

FIG. 5 illustrates a manner in which data may be stored to the flash memory module 142. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024 B (1 KB), etc., and the MUs 170 may have a second nominal size, such as 4096 B (4 KB), etc. The application of data compression may cause each MU to have a smaller size in terms of actual bits written to the flash memory 142.

The MUs 170 are arranged into the aforementioned pages 150 (FIG. 3) which are written to the flash memory 142. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 170) to enable the SSD 110 to locate the physical location of existing data. For example, during the servicing of a read command it is generally necessary to locate the physical address within the flash memory 144 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
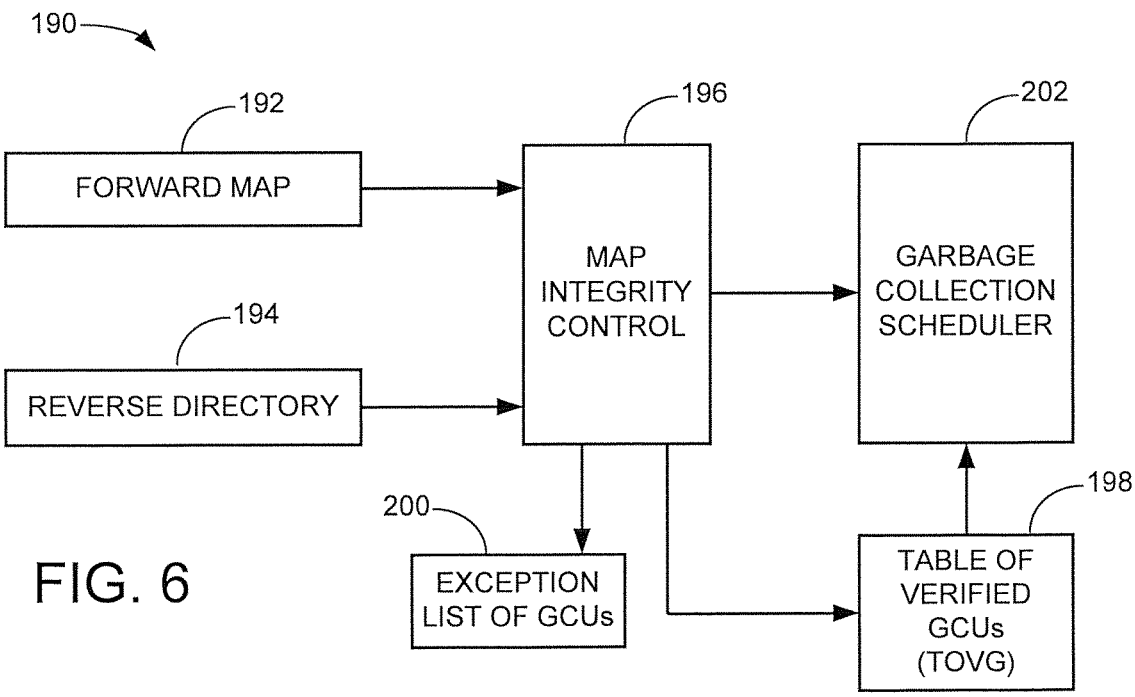
FIG. 6 shows a functional block diagram for a GCU management circuit of the SSD in accordance with some embodiments.

FIG. 6 shows a functional block diagram for a GCU management circuit 190 of the SSD 110 in accordance with some embodiments. The circuit 190 may form a portion of the controller 112 and may be realized using hardware circuitry and/or one or more programmable processor circuits with associated firmware in memory. The circuit 190 includes the use of a forward map 192 and a reverse directory 194. As noted above, the forward map and reverse directory are metadata data structures that describe the locations of the data blocks in the flash memory 142. During the servicing of host data transfer operations, as well as other operations, the respective portions of these data structures are located in the flash memory or other non-volatile memory location and copied to local memory 120 (see e.g., FIG. 2).

The forward map 192 provides a flash transition layer (FTL) to generally provide a correlation between the logical addresses of various blocks (e.g., MUAs) and the physical addresses at which the various blocks are stored (e.g., NVMe set, die, plane, GCU, EB, page, bit offset, etc.). The contents of the forward map 192 may be stored in specially configured and designated GCUs in each NVMe set.

The reverse directory 194 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 190 further includes a map integrity control circuit 196. As explained below, this control circuit 196 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 198. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 196 find a mismatch between the forward map 192 and the reverse directory 194 for a given GCU, the control circuit 196 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 192 indicates that there should be some number X valid blocks in the selected GCU, such as 12 valid blocks, but the reverse directory 194 indicates that there are only Y valid blocks, such as 11 valid blocks, and the 11 valid blocks indicated by the reverse directory 194 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit 196 can expend the resources as available to proactively update the metadata. In some embodiments, an exception list 200 may be formed as a data structure in memory of GCUs that have been found to require further evaluation by the control circuit 196. In this way, the GCUs can be evaluated later at an appropriate time for resolution, after which the corrected GCUs can be placed on the verified list in the TOVG 198.

It will be noted that the foregoing operation of the control circuit 196 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
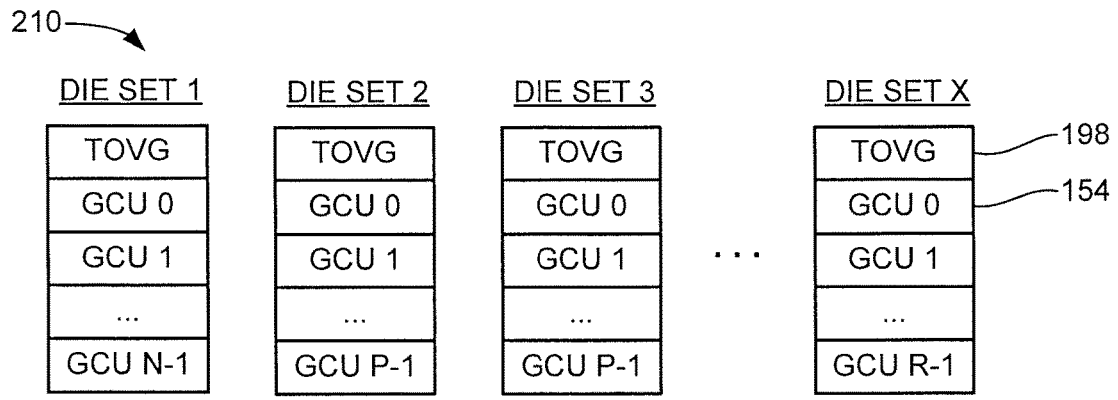
FIG. 7 shows an arrangement of various GCUs and corresponding tables of verified GCUs (TOVGs) for a number of different die sets in some embodiments.

FIG. 7 shows a number of NVMe sets 210 that may be arranged across the SSD 110 in some embodiments. Each set 210 may have the same nominal data storage capacity (e.g., the same number of allocated dies, etc.), or each may have a different storage capacity. The storage capacity of each NVMe set 210 is arranged into a number of GCUs 154 as shown. In addition, a separate TOVG (table of verified GCUs) 198 may be maintained by and in each NVMe set 210 to show the status of the respective GCUs. From this, each time that it becomes desirable to schedule a garbage collection operation, such as to free up new available memory for a given set, the table 198 can be consulted to select a GCU that, with a high degree of probability, can be subjected to an efficient garbage collection operation without any unexpected delays due to mismatches in the metadata (forward map and reverse directory).

Figure 8:
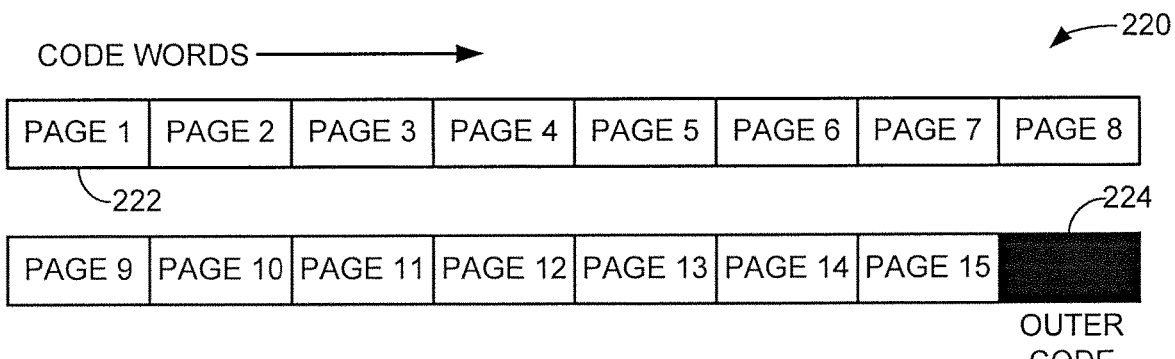
FIG. 8 displays an example parity data set that can be utilized in an example data storage system operated in accordance with assorted embodiments.

In FIG. 8, the parity data set has fifteen (15) user data pages 222, with each user data page, or payload, written to a different one of the dies. More generally, the GCU has N erasure blocks on a corresponding N dies, and payloads 222 are written to N−1 of the dies. The Nth die receives an outer code (parity value), which is represented at 224. As mentioned above, the outer code may be generated by summing the page data in a buffer using an XOR function. Because the parity data set 220 has data boundaries that nominally match the GCU boundaries, the parity data set in FIG. 8 is referred to as a standard parity data set since the data matches the available memory.

Figure 9:
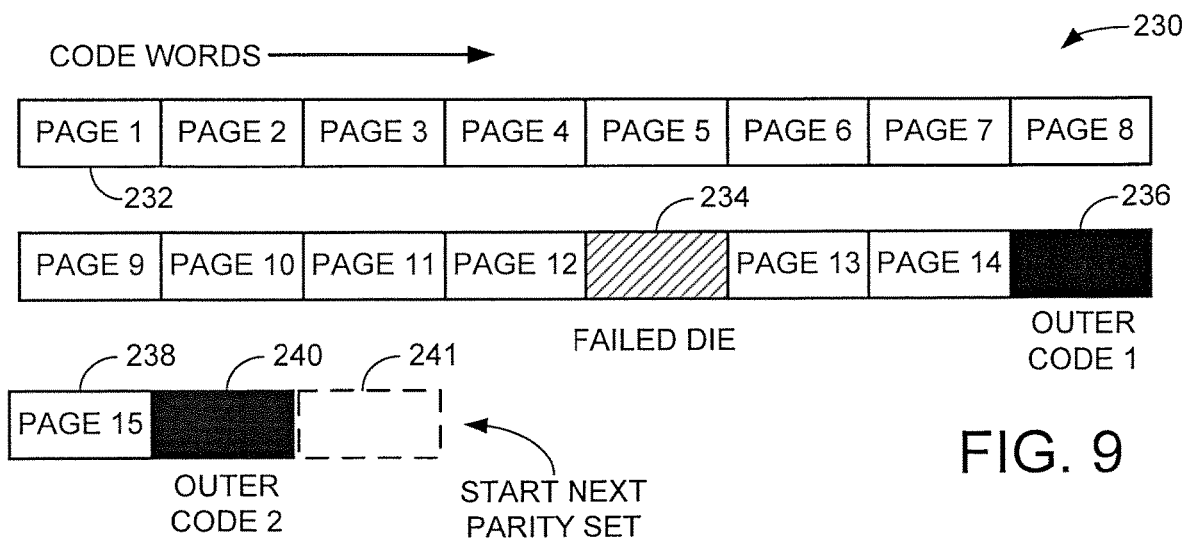
FIG. 9 is an example non-standard data set that may occur in the data storage device of FIG. 1 in accordance with various embodiments.

FIG. 9 shows a non-standard parity data set 230. The parity data set 230 is the same size as the parity data set 220 in FIG. 8 in that, as before, the parity data set 230 has a total of fifteen (15) pages/payloads 232. However, one of the dies 144 has experienced a failure, as indicated at 234, so that the GCU only spans 15 dies.

Accordingly, the controller circuit 112 (FIG. 2) operates to write a full set of the available pages, which in this case is Page 1 to Page 14, through the available dies. This is followed by the writing of a first outer code (parity value) in the Nth location, as shown at 236, which protects the payloads (Page 1 to Page 14) written during this first pass through the available dies.

A leftover payload 238 (Page 15) is written to the next available page in the first die (such as adjacent Page 1). This leftover payload is referred to as a runt or runt data, and represents the remainder after an integer number of passes have been made through the available dies. Once all of the leftover payloads have been written, a second outer code (parity value) is written in the next available die, as shown at 240. This second outer code is disposed in the same die as, and is adjacent to, the Page 2 payload.

In this way, when leftover (runt) payload sets remain, these are written to as many additional dies as are required, followed by the writing of a final parity value to cover the runts. Map data may be generated to note the non-standard outer code arrangement. This provides a parity data set with a parity value to protect each pass through the dies, plus another parity value to cover the remainder.

While FIG. 9 shows the non-standard parity data set has arisen due to a non-standard sized available memory (e.g., due to the die failure at 234), other non-standard parity data sets can arise based on other factors. For example, a particular data set to be written to a given NVMe set may make up a total number of MUs that do not align with the GCU boundaries. In another case, data compression or other processing may result in a non-standard sized parity data set. It will be appreciated that if a given GCU has N dies, then a non-standard sized data set will have a total number M payloads (or portions thereof) that are not divisible by N without a remainder. The remainder could be any value from one extra payload up to N−1 extra payloads. Regardless, each pass through the dies will be parity protected, irrespective of the overall length of the parity data set.

Once a non-standard parity set is written, map data may be generated and stored to indicate the fact that the parity data set is of non-standard length. Information may be stored in the map data such as how much longer the data set is in terms of additional pages in the remainder, the location of the last parity value (e.g., 240), etc. To maximize data density, the controller may operate to initiate the writing of the next parity data set at the next available page on the next die in the sequence, as shown at 241 in FIG. 9.

Figure 10:
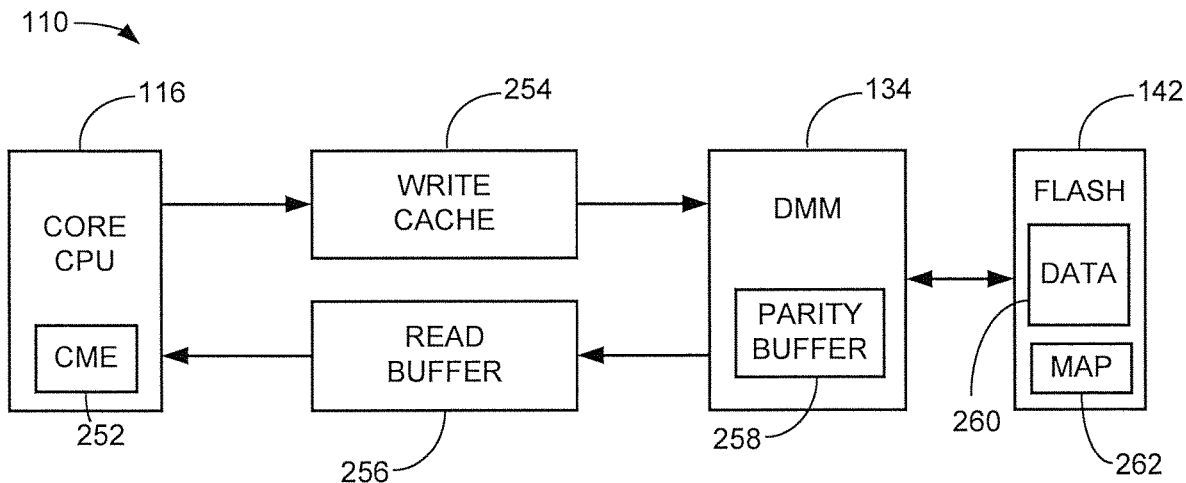
FIG. 10 shows a functional block representation of an example data storage device configured in accordance with some embodiments.

FIG. 10 shows a functional block representation of additional aspects of the SSD 110. The core CPU 116 from FIG. 2 is shown in conjunction with a code management engine (CME) 252 that can be used to manage the generation of the respective code words and outer code parity values for both standard and non-standard parity data sets.

During write operations, input write data from the associated host are received and processed to form MUs 170 (FIG. 5) which are placed into a non-volatile write cache 254 which may be flash memory or other form(s) of non-volatile memory. The MUs are transferred to the DMM circuit 134 for writing to the flash memory 142 in the form of code words 172 as described above. During read operations, one or more pages of data are retrieved to a volatile read buffer 256 for processing prior to transfer to the host.

The CME 252 determines the appropriate inner and outer code rates for the data generated and stored to memory. In some embodiments, the DMM circuit 134 may generate both the inner and outer codes. In other embodiments, the DMM circuit 134 generates the inner codes (see e.g., LDPC circuit 138 in FIG. 2) and the core CPU 116 generates the outer code words. In still other embodiments, the same processor/controller circuit generates both forms of code words. Other arrangements can be used as well. The CME 252 establishes appropriate code rates for both types of code words.

During generation of the outer codes, a parity buffer 258 may be used to successively XOR each payload being written during each pass through the dies. Both payload data 260 and map data 262 will be stored to flash memory 142.

Figure 11:
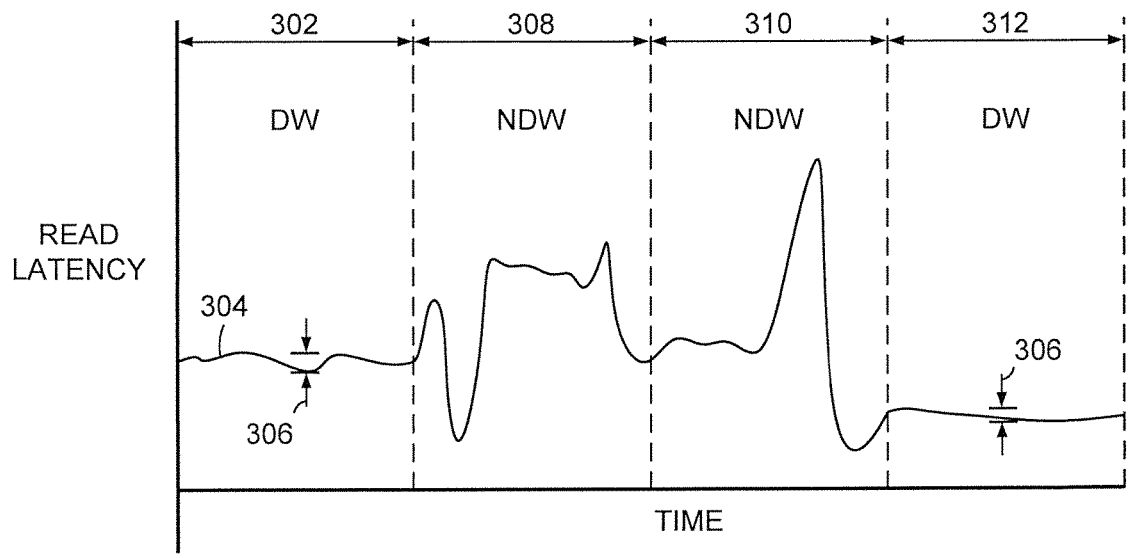
FIG. 11 plots operational data for an example data storage system employing various embodiments of the present disclosure.

FIG. 11 plots example operational data for a data storage system configured and operated in accordance with various embodiments to improve data read performance during deterministic windows. As shown, read latency is charted over time involving deterministic window (DW) and non-deterministic window (NDW) intervals. During a first DW interval 302, read latency, as indicated by solid line 304, of a plurality of reads to different portions of a memory is maintained within a relatively tight range 306, which corresponds with data read consistency over time. It is contemplated that different data read performance metrics, such as error rate and overall time to return data to a host, can be used in substitution of, or in combination to, the read latency of FIG. 11 with similarly tight ranges 306, and approximately uniform consistency, of read performance being maintained.

The tight consistency of data reads during the DW can be, at least partially, contributed to background data maintenance operations and/or data writes being reduced or suspended. A DW interval is followed by one or more NDW intervals, such as interval 308, where pending data writes and background data maintenance operations are carried out along with data reads. The inherent behavior of data writes that involve data erases prior to programming data and data maintenance operations that involve varying volumes of processing, data reads, and data writes contribute to the variance of read latency The second NDW 310 shows how data accesses and data maintenance operations are not consistent and can be considered random compared to the tight range 306 of data latency performance the DW intervals 302 and 312. It is noted that the consistent performance for the first DW interval 302 is at a different latency value than the second DW interval 312. Hence, consistency is prioritized throughout a DW interval regardless of the latency value that is consistently provided to a host, even at the expense of providing less than the fastest possible read performance. In other words, predictable read latency, and performance, are emphasized during a DW interval even if that means providing higher read latency than possible.

Figure 12:
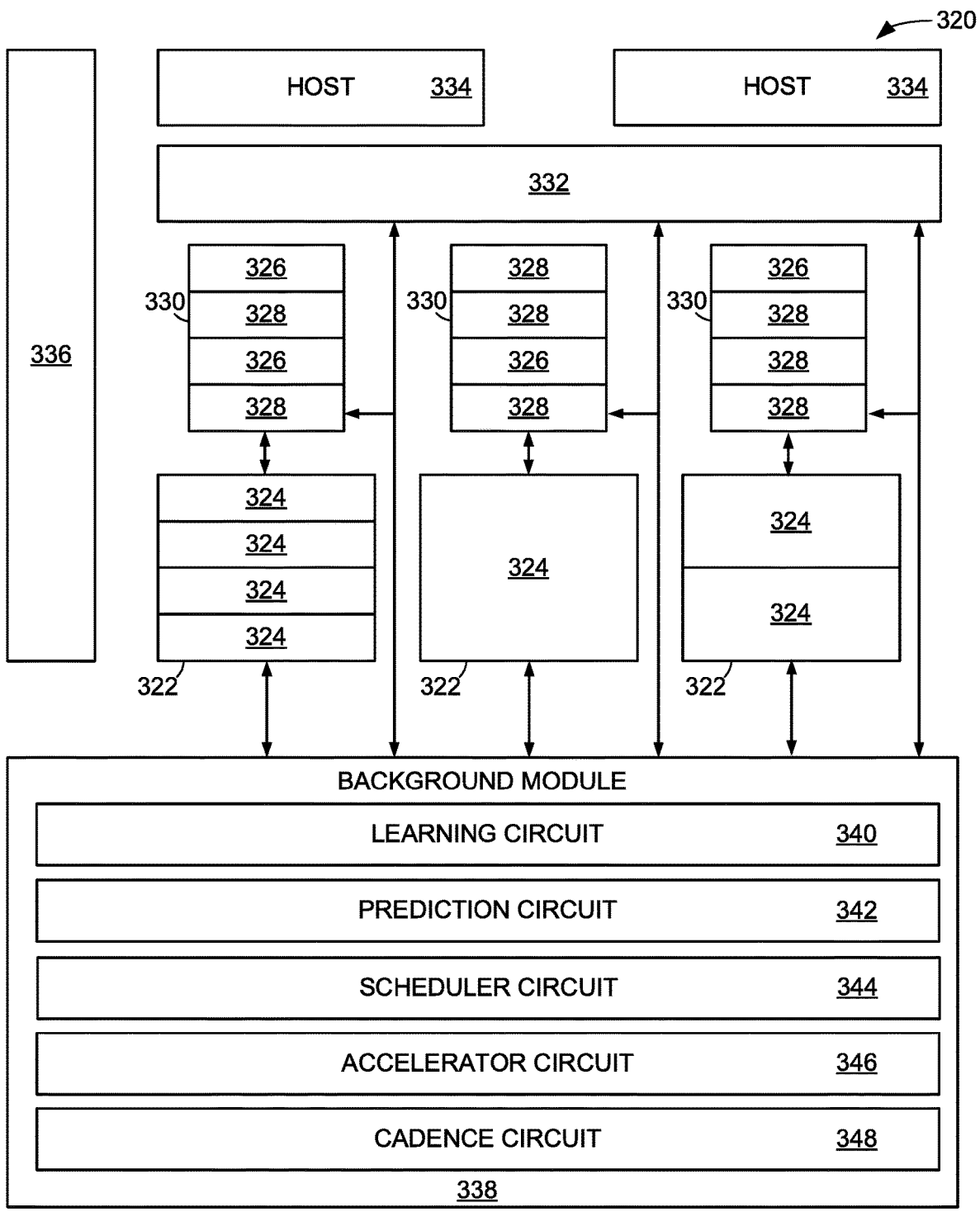
FIG. 12 conveys portions of an example data storage system in which various embodiments can be practiced.

FIG. 12 illustrates portions of an example data storage system 320 in which various embodiments can be practiced. The data storage system 320 has a plurality of separate die 322 that may have similar, or dissimilar, data storage capabilities and performance. The separate dice 322 each comprise a number of die sets 324 in one or more planes. In some embodiments, a single die set 324 occupies an entire memory die 322 while other embodiments arrange multiple die sets 324 on a single memory die 322.

Regardless of the number of die sets 324 per die 322, data access operations 326 and background data maintenance operations 328 can be pending in one or more queues 330 for activation in one or more assigned die/die set. It is contemplated, but not required, that some data operations can be pending for any available die/die set in a universal queue 332. At any time, a host 334 can request at least a portion of the data storage system 320 enter a deterministic window interval. If accepted, at least one die set 324 is configured by a local controller 336 to provide consistent data read latency irrespective of the performance capabilities of the memory, such as providing a predictable, consistent read latency that is less than the fastest read latency capable to the selected die set(s) 324.

With the use of the assorted die/die sets for data accesses, such as data reads and data writes, background data maintenance operations are necessary to maintain the data storage capabilities of a data storage system. While not limiting, background operations can be any operation that is not a data access requested by a host, such as garbage collection, memory cell refresh, map updates, journaling of maps, and tracking of errors/faults. One or more local controllers 336 can provide processing capabilities for a background module 338 to optimize the scheduling and execution of background data maintenance operations with particular emphasis on providing consistent data read latency throughout a deterministic window interval.

The background module 338 may be configured with a learning circuit 340 that identifies current background operations that are scheduled in queues 330/336, or otherwise are pending to be conducted on one or more die/die sets. The learning module 340, in some embodiments, adapts the frequency and/or type of scheduled background operation to accommodate changing data access behavior in at least one die set, such as increased number of data writes, errors, or priority of stored data. The learning module 340 can identify patterns in pending, and executed, data accesses and background operations, to generate new background operations, such as map updates, to increase the speed and accuracy (performance) of at least one die/die set.

The real-time detection of pending and executed background operations, along with the generation of new background operations, allows the learning circuit 340 to identify what system 320 resources are going to be consumed over time and what impact background operation execution will have on the read latency if a deterministic window interval is requested by a host 334. The detection of current, and past, background operations can be complemented by a prediction circuit 342 that forecasts future background operations that are not yet pending in any queue 330/336. The prediction circuit 342 can utilize model data from other data storage systems and/or past logged activity from the present system 320 to predict what future background operations are likely to be queued and subsequently executed.

The prediction circuit 342 can employ machine learning to improve the accuracy of forecasted background operations based on real-time system 320 conditions. It is contemplated the prediction circuit 342 can generate an accuracy value for forecasted background operations and only provide those operations predicted to be above a predetermined accuracy threshold, such as 90% confidence in a prediction. The ability to predict future background operations, as well as future data accesses that trigger the background operations, with the prediction circuit 342 allows the background module 338 to organize existing background operations so that future background operations do not inhibit or degrade consistent read access latency during deterministic window intervals.

Knowledge of existing background operations with the learning circuit 340 and likely future background operations with the prediction circuit 342 allows a scheduler circuit 344 of the background module 338 to alter the assigned parameters of one or more queued background operations 328, and/or queued data accesses 326, to execute background operations 328 during non-deterministic window intervals in a manner that optimizes deterministic window interval read latency consistency. As a non-limiting example, the scheduler circuit 344 can alter the preexisting order of a queue 330/336 or the assigned die/die set of a queued background operation 328 to organize the queues 330/336 in a manner where a deterministic window interval could be undertaken by any die set 324 without background operations 328 pending in a die queue 330.

The alteration of pending background operations 328 by the scheduler circuit 344 can alleviate some instances of large volumes of queued background operations 328 and/or instances of lengthy queued background operations 328. In yet, the background module 338 can also be configured with the ability to accelerate the execution of selected queued data accesses 326 and/or background operations 328 to optimize queue 330/336 organization for deterministic window intervals. That is, an accelerator circuit 346 of the background module 338 can selectively accelerate the execution of one or more queued actions 326/328 to organize a die queue 330 to provide as consistent as possible read latency during a deterministic window interval.

It is noted that the accelerator circuit 346, in some embodiments, may change the number of clock cycles between background operations 328, execute multiple different background operations 328 on different die sets 324 concurrently, or conduct less than all of a prescribed operation 328 to decrease the time spent executing background operations 328. For some background operations 328, such as read refreshes where every memory cell of a die set 324 is pulsed to ensure a stable resistance, a cadence circuit 348 can be employed to accelerate background operation 328 execution. As a non-limiting example, the cadence circuit 348 can increase, decrease, or otherwise alter the frequency in which memory cells of a die set 324 are pulsed in order to complete the background operations 328 in a manner conducive to increasing consistency of read latency during a deterministic window interval.

Figure 13:
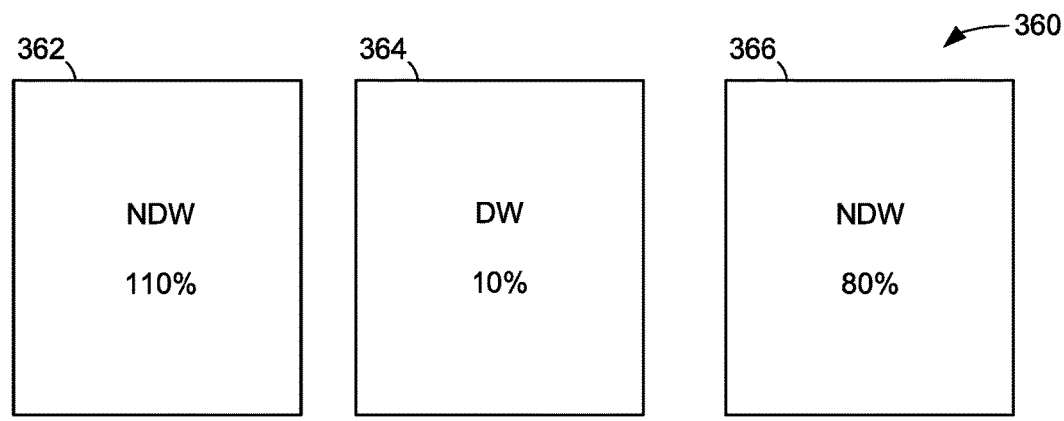
FIG. 13 depicts a block representation of portions of an example data storage system configured and operated in accordance with some embodiments.

FIG. 13 is a block representation of portions of an example data storage system 360 in which a background module 338 manipulates the cadence of background operations to optimize the queued activity for a die set. As shown, a first die set 362 is undergoing a non-deterministic window interval (NDW) while a second die set 364 undergoes a deterministic window interval (DW) and a third die set 366 undergoes an NDW. The background module, and particularly the cadence and accelerator circuits, can assess the current, and predicted, queued activity for each die set 362/364/366 to generate a cadence strategy where background operations are carried out more, or less, quickly as allowed by the current, real-time processing capabilities of the data storage system 360.

Although not limiting or required, the background module 338 can increase the cadence of background operation execution in an NDW, such as by 10% over a default execution speed in set 362, can decrease the execution of background operations in a DW compared to the default speed, such as in set 364, and can reduce the execution of background operations during an NDW, such as in set 366. The ability to adjust the execution cadence of some background operations independently on different die sets allows the data storage system 360 to be ready for a deterministic window request from a host for a multitude of different die sets 362/366. In addition, the ability to reduce the execution cadence during DW allows for system processing to be maximized towards servicing consistent data read requests.

Figure 14:
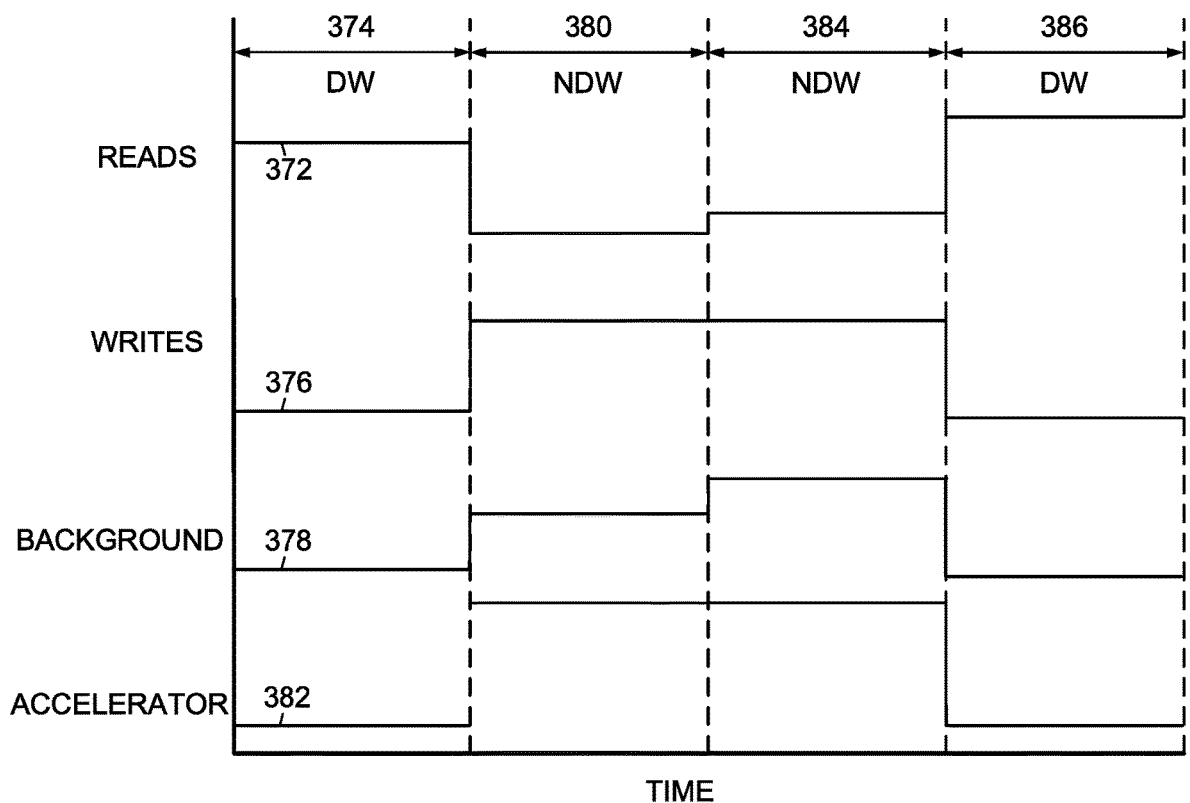
FIG. 14 provides an example timing diagram for portions of a data storage system operated in accordance with assorted embodiments.

With the background module 338 able to assess and optimize background operation execution of individual die sets concurrently during NDW, the data storage system 360 can enjoy increased performance, particularly during DW. FIG. 14 plots a timing diagram for an example die set of a data storage system employing a background module in accordance with various embodiments. A die set can service a number of separate data read commands, as illustrated by line 372, during a first DW 374. Concurrently, or sequentially, with the servicing of data reads, any number of data write commands can be serviced, as illustrated by line 376, along with any number of background operations, as illustrated by line 378.

It is noted that the various reads 372, writes 376, and background operations 378 can be executed to a single die set or to multiple different die sets on one or more dice. In comparison to the DW execution of interval 374, an NDW interval 380 corresponds with the execution of a lower volume of data reads 372, more data writes 376, and more background operations 378. The increased background operations 378 may be facilitated by greater accelerator circuit activity, as illustrated by line 382.

In a second sequential NDW interval 384, different numbers of data reads 372 and background operations 378 are executed compared to the first NDW interval 380 while the number of data writes 374 stays substantially the same. It is contemplated that the background module alters the various read and background operation execution volumes in response to detected, and/or predicted, die set queue activity to configure the respective die set queues for as consistent as possible data read performance, such as error rate, latency, and total time to host. Such background module behavior is exhibited in DW interval 386 where execution of data writes 376 and background operations 378 are significantly reduced compared to the NDW intervals 380/384 while execution of data reads 372 is increased.

Figure 15:
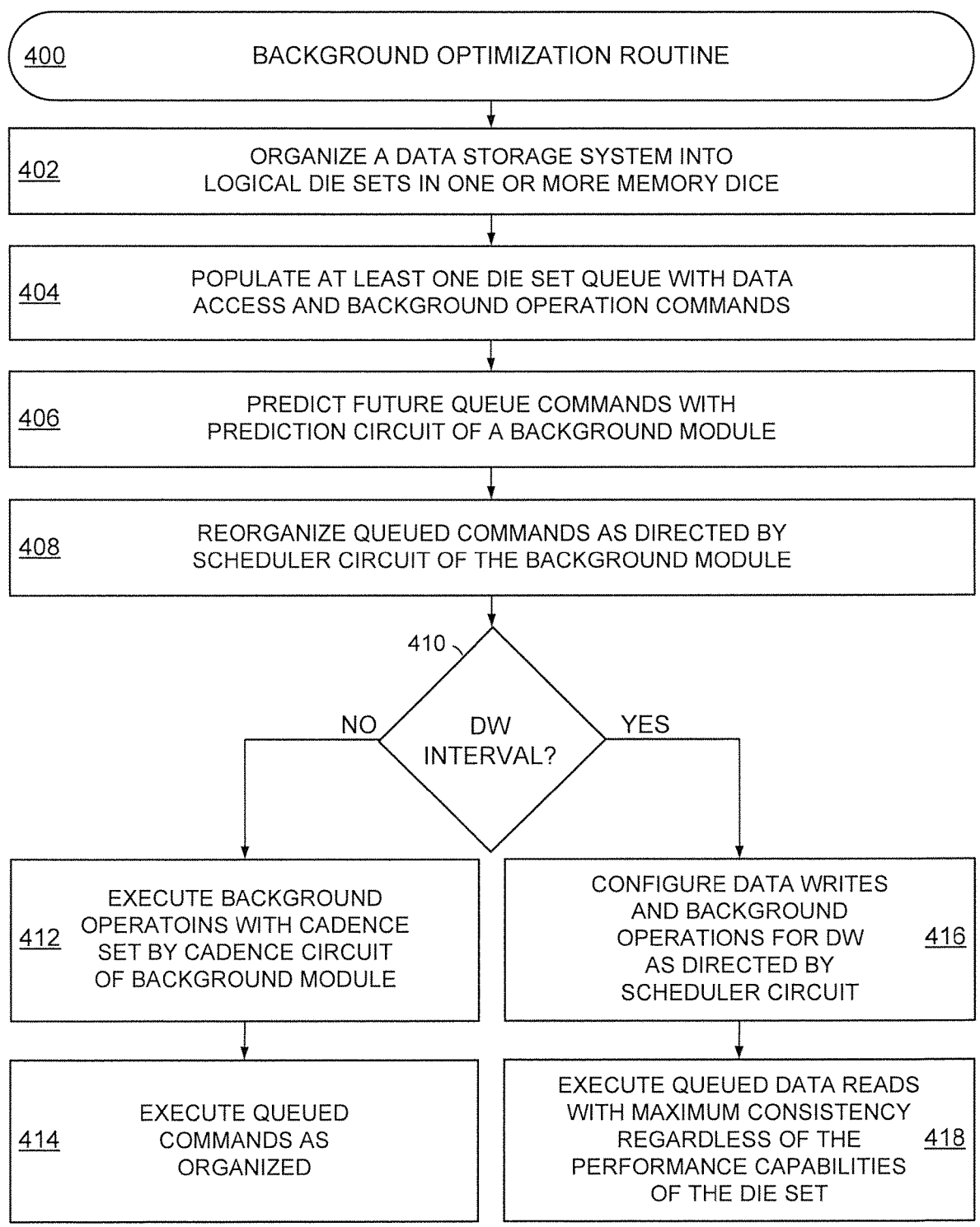
FIG. 15 displays an example background optimization routine that can be carried out with the respective embodiments of FIGS. 1-14.

Through the optimization of data access and background operation execution in NDW intervals, as directed by a background module, die set queues of a data storage system can have reduce amounts of data writes and background operations that can degrade consistency of data reads during DW intervals. FIG. 15 is a flowchart of an example background optimization routine 400 that can be carried out with the assorted embodiments of FIGS. 1-14. Initially, a data storage system can be organized in step 402 into one or more logical die sets present in one or more memory dice. At least one die set queue is populated in step 404 with data access commands and/or background operations to be carried out to a die set assigned by a host and/or local system controller.

As data access and background operation commands fill a die set queue and are being executed, step 406 utilizes a prediction circuit of a background module to predict what future commands are likely to replace executed commands in the die set queue. Such prediction can be undertaken with respect to current, detected system conditions, such as error rate, number of connected remote hosts, average ratio of data reads to data write requests, and priority of background operations for a particular memory die. The current command population of a die set queue along with the predicted commands from step 406 are taken into account by a scheduler circuit of the background module in step 408 to reorganize the die set queue for NDW interval optimization. The reorganization of step 408 may, in some embodiments, involve moving pending commands within a queue, moving commands into a queue, moving commands out of a queue, or changing the execution order without moving queued commands.

With the die set queue optimized for NDW interval execution, decision 410 determines if the die set is entering a DW interval. If not, step 412 is triggered to execute the queued background operations from step 408 as directed by a cadence and accelerator circuits of the background module. The execution of background operations in step 412 may occur prior to, or concurrently with, step 414 where non-background operation queued commands are executed as organized by step 408. At the end of step 414, a die set queue will have a reduced number of pending writes and background operations, which allows the remaining queued read commands to execute more consistently. Following the NDW interval activity of step 414, the routine 400 returns to 406 where queued commands are predicted and subsequently organized for optimal DW performance.

In the event decision 410 discovers a DW interval is imminent, step 416 proceeds to reconfigure the die set queue from step 408 to prioritize data read commands that are then carried out in step 418. The reconfiguration of step 416 may move, or prioritize, one or more queued commands to minimize the execution of data writes and/or background operations in step 418 during the upcoming DW interval. It is noted that steps 412 and 414 may concurrently be active on other die sets, and dice, of a data storage system that are in a NDW interval while steps 416 and 418 operate. The potential combination of different die sets having dissimilar queue configurations that operate simultaneously, but are respectively optimized for a DW interval from step 416 or for an NDW interval from step 408 allows the numerous die sets of a data storage system to be ready for DW intervals faster and provide more consistent data read performance during those DW intervals.

What is claimed is:

1. A method comprising:
   accumulating a list in a memory of background operations to be carried out upon a semiconductor memory formed of non-volatile memory (NVM) dies;
   entering a deterministic window (DW) interval responsive to a request from a host during which data transfers between the host and the semiconductor memory meet a minimum predetermined data transfer rate;
   sorting the list into a first set of the background operations that can be performed during the DW interval while maintaining the minimum predetermined data transfer rate and a remaining second set of the background operations;
   performing the first set of the background operations during the DW interval with a first cadence; and subsequently performing the second set of the background operations and at least one other set of background operations after a conclusion of the DW interval with a second cadence, the first and second cadences being different.

2. The method of claim 1, wherein an accelerator circuit of a background module connected to the NVM dies changes a number of clock cycles between background operations of the first set of background operations.

3. The method of claim 1, wherein a learning circuit of a background module connected to the NVM dies adapts a frequency of execution of background operations in the first set of background operations to accommodate changing data access behavior in at least one die set of the NVM dies.

4. The method of claim 3, wherein the learning circuit identifies patterns in pending background operations to generate new map updates.

5. The method of claim 3, wherein the learning circuit identifies patterns in background operations executed during the DW interval to generate new map updates.

6. The method of claim 3, wherein the learning circuit predicts at least one resource that will be consumed and the effect of the consumed at least one resource on read latency during the DW interval.

7. The method of claim 1, wherein a prediction circuit of a background module connected to the NVM dies employs machine learning to improve an accuracy of background operations forecasted based on at least one detected condition in the NVM dies.

8. The method of claim 7, wherein the prediction circuit generates an accuracy value for the forecasted background operations.

9. The method of claim 7, wherein the background operations are sorted into the first set of background operations and the second set of background operations based on background operations forecasted by the prediction circuit.

10. The method of claim 1, wherein a scheduler circuit of a background module connected to the NVM dies alters at least one parameter assigned to one or more queued background operations to execute the second set of background operations during a non-deterministic window interval.

11. A method comprising:
accumulating a list in a memory of background operations to be carried out upon a semiconductor memory formed of non-volatile memory (NVM) dies;
entering a deterministic window (DW) interval responsive to a request from a host during which data transfers between the host and the semiconductor memory meet a minimum predetermined data transfer rate;
sorting the list into a first set of the background operations that can be performed during the DW interval while maintaining the minimum predetermined data transfer rate and a remaining second set of the background operations;
performing the first set of the background operations during the DW interval with a first cadence; and
subsequently performing the second set of the background operations after a conclusion of the DW interval with a second cadence.

12. The method of claim 11, wherein the first and second cadences are each set by a cadence circuit of a background module connected to the NVM dies.

13. The method of claim 11, wherein the first cadence is less than the second cadence.

14. The method of claim 11, wherein the first cadence is consistently carried out throughout the DW interval.

15. The method of claim 11, wherein the first and second cadences each correspond with a frequency in which memory cells of a die set of the NVM dies are pulsed.

16. The method of claim 11, wherein the first cadence is selected to maintain the minimum predetermined data transfer rate during the DW interval.

17. The method of claim 11, wherein the first cadence is selected to increase read latency consistency during the DW interval.

18. The method of claim 11, wherein the first cadence is greater than the second cadence.

19. A data storage system comprising a semiconductor memory formed of at least one non-volatile memory (NVM) dies, a background module connected to the at least one NVM dies configured to accumulate a list in a memory of background operations to be carried out upon the semiconductor memory and sort the list into a first set of background operations and a second set of background operations, the first set of background operations executed by a controller during a deterministic window (DW) interval responsive to a request from a host during which data transfers between the host and the semiconductor memory meet a minimum predetermined data transfer rate, the first set of background operations executed at a first cadence while maintaining the minimum predetermined data transfer rate, the controller configured to execute the second set of background operations after a conclusion of the DW interval at a second cadence, the first and second cadences being different.

20. The data storage system of claim 19, wherein a learning circuit connected to the at least one NVM dies identifies currently pending background operations in at least one queue.

* * * * *